(12) United States Patent
Zimmermann (10) Patent No.: US 7,942,212 B2
(45) Date of Patent: May 17, 2011

(54) HAND-GUIDED POWER TOOL (75) Inventor: Helmut Zimmermann, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 188 days.

(21) Appl. No.: 12/248,963

(22) Filed: Oct. 10, 2008

(65) Prior Publication Data

US 2009/0095497 A1 Apr. 16, 2009

(30) Foreign Application Priority Data

Oct. 11, 2007 (DE) .................. 10 2007 048 887

(51) Int. Cl.
*B25D 17/04* (2006.01)
(52) U.S. Cl. .................. 173/162.1; 173/162.2; 173/171
(58) Field of Classification Search ............... 173/162.1, 173/162.2, 175; 267/178, 179; 16/110.1
See application file for complete search history.

(56) References Cited

U.S. PATENT DOCUMENTS

| | | | | | |
|---|---|---|---|---|---|
| 199,945 | A | * | 2/1878 | Vose | 267/33 |
| 5,025,870 | A | * | 6/1991 | Gantner | 173/162.2 |
| 5,361,500 | A | * | 11/1994 | Naslund et al. | 30/381 |
| 5,368,107 | A | * | 11/1994 | Taomo | 173/162.2 |
| 5,722,645 | A | * | 3/1998 | Reitter | 267/177 |
| 6,375,171 | B1 | * | 4/2002 | Zimmermann et al. | 267/137 |
| 6,799,642 | B2 | * | 10/2004 | Wolf et al. | 173/162.2 |
| 7,219,433 | B2 | * | 5/2007 | Gorenflo et al. | 30/383 |
| 7,270,320 | B2 | * | 9/2007 | Menzel et al. | 267/175 |
| 7,357,380 | B2 | * | 4/2008 | Menzel et al. | 267/179 |
| 7,412,959 | B2 | * | 8/2008 | Wolf et al. | 123/198 E |
| 7,523,790 | B2 | * | 4/2009 | Arakawa et al. | 173/162.2 |
| 7,527,252 | B2 | * | 5/2009 | Oohashi | 267/170 |
| 7,584,945 | B2 | * | 9/2009 | Maeno et al. | 267/140.13 |
| 2002/0104665 | A1 | * | 8/2002 | Wolf et al. | 173/162.2 |
| 2006/0219418 | A1 | * | 10/2006 | Arakawa et al. | 173/162.2 |
| 2007/0034396 | A1 | * | 2/2007 | Berger et al. | 173/162.2 |
| 2008/0276469 | A1 | * | 11/2008 | Guip et al. | 30/383 |
| 2009/0095497 | A1 | * | 4/2009 | Zimmermann | 173/162.2 |
| 2009/0314507 | A1 | * | 12/2009 | Iwakami | 173/162.2 |

* cited by examiner

*Primary Examiner* — Rinaldi I Rada
*Assistant Examiner* — Gloria R Weeks
(74) *Attorney, Agent, or Firm* — Gudrun E. Huckett (57) ABSTRACT

A hand-guided power tool has a drive motor and a tool in driving connection with the drive motor. At least one handle is provided for guiding the power tool in operation. At least one antivibration element functionally connects the at least one handle and the drive motor. The at least one antivibration element has a coil spring and a guide, wherein the coil spring has an end connected to the guide. The coil spring has a first radial spacing relative to the guide in a first radial direction and has a second radial spacing relative to the guide in a second radial direction, wherein the second spacing is smaller than the first spacing or is zero.

20 Claims, 6 Drawing Sheets

HAND-GUIDED POWER TOOL

BACKGROUND OF THE INVENTION

The invention relates to a hand-guided power tool comprising a drive motor for driving a tool of the power tool and comprising at least one handle for guiding the power tool in operation. The handle is functionally connected to the drive motor by means of at least one antivibration element wherein the antivibration element comprises a coil spring that is arranged at least with one end on a guide wherein the coil spring has a first spacing in a first radial direction relative to the guide.

U.S. Pat. No. 7,270,320 B1 discloses an antivibration element on a portable hand-guided power tool that comprises a coil spring that is provided in an end section with play relative to a guide of the coil spring. In this way, a progressive characteristic line of the spring can be achieved.

Known antivibration elements with coil springs have the same stiffness in all directions transverse to the longitudinal direction of the coil spring. In order to be able to achieve a different damping behavior in different directions, several antivibration elements must be arranged accordingly in the different directions. The use of antivibration elements comprised of rubber is also known for achieving different damping actions in different directions; these rubber elements have different stiffness as a result of different geometries in the different directions.

SUMMARY OF THE INVENTION

It is an object of the present invention to provide a hand-guided power tool of the aforementioned kind that has excellent vibration damping properties.

In accordance with the present invention, this is achieved in that the coil spring has relative to the guide in a second radial direction a second spacing that is smaller than the first spacing in the first direction or has no spacing to the guide in the second radial direction (second spacing is zero).

In that the spacing of the coil spring relative to the guide in different directions is of different magnitude, different damping effects of the coil spring in the different directions are obtained. Therefore, different characteristic lines of the spring are observed depending on in which direction the antivibration element is under load. When in a second radial direction no spacing is provided between the coil spring and the guide, the effective spring length in this direction is shortened without the spring being under load. In this way, a higher stiffness of the antivibration element is generated in this direction. In this way, it is possible in a simple way to achieve damping characteristics that are well matched to the respective power tool. Additional components for achieving such a matched damping action are not required so that the damping action can be adjusted even in the case of existing power tools by exchanging at least one guide and/or the coil spring.

Advantageously, the guide has a securing section in which the coil spring is fixedly secured on the guide. It is provided that the guide has a guide section in which the coil spring has the first spacing relative to the guide wherein the guide section is positioned closer to the center of the coil spring than the securing section. The component that comprises the guide serves in this way as a fixation means for the coil spring on neighboring components as well as an adjusting means for the damping characteristics. Additional components for attachment of the coil spring are therefore not needed. Advantageously, the guide has a cross-section that deviates from a circular shape. In particular, the guide has an oval cross-section. By means of an oval cross-section, it is possible to provide in two perpendicularly positioned directions a smallest damping action and a greatest damping action. In the intermediately positioned directions, there is a transition of the damping action from the greatest damping action to the smallest damping action in accordance with the change in cross-section. However, it can also be provided that the guide has a circular cross-section that has a flattened portion in at least one area. A flattened circular cross-section causes a reduced stiffness of the antivibration element only in the direction where the flattened portion is positioned. When loading in the opposite direction the stiffness remains unchanged at its high level. By providing several flattened portions within the cross-section, the damping action can be adjusted well.

Additionally or alternatively to a cross-section of the guide that deviates from a circular shape it can be provided that the spring has a cross-section that deviates from a circular shape. The cross-sections of guide and spring are different in this connection so that in different directions different spacings between guide and coil spring will result. A simple design results when the coil spring is flattened at least at one longitudinal side within the guide section. In the radial direction where the coil spring is flattened and where thus the spacing between coil spring and guide is reduced, the stiffness of the antivibration element is increased.

Advantageously, the guide comprises a spirally shaped groove that extends at least across a section of the guide. The groove effects a guiding action for the coil spring in the transverse direction as well as in the longitudinal direction of the longitudinal center axis of the antivibration element. In particular, the groove extends cross the entire length of the guide. In order to achieve a progressive characteristic line also in the longitudinal direction of the antivibration element, it is provided that the coil spring has a third spacing relative to the groove in the direction of the longitudinal center axis of the antivibration element within the guide section. However, it can also be provided that the spring is not guided in the guide section in the direction of the longitudinal center axis of the antivibration element. The guide section can therefore have a smooth surface that can be produced in a simple way. A groove is thus not needed in this area.

Advantageously, the power tool is a motor chainsaw with a saw chain that is driven in circulation about a guide bar. At least one antivibration element is oriented transversely to the plane of the guide bar. The motor chainsaw has a longitudinal direction that is oriented in the longitudinal direction of the guide bar of the motor chainsaw; a vertical direction extending perpendicularly to the longitudinal direction in the plane of the guide bar; and a transverse direction that extends transversely to the plane of the guide bar. It has been found that in a motor chainsaw excellent vibration damping properties result when the first spacing is oriented in the vertical direction of the motor chainsaw. Therefore, minimal stiffness of the antivibration element is provided in the vertical direction of the motor chainsaw. Advantageously, the second spacing is oriented in the longitudinal direction of the motor chainsaw. In the longitudinal direction of the motor chainsaw, a high stiffness of the antivibration element is thus achieved. In this way, an excellent guiding behavior of the motor chainsaw results. However, it can also be provided that the coil spring in the longitudinal direction of the motor chainsaw has no spacing relative to the guide. In this way, a high stiffness in the longitudinal direction of the motor chainsaw is achieved without a progressive characteristic line being generated in this direction.

Advantageously, the motor chainsaw has a grip pipe that spans the motor housing of the motor chainsaw; a first antivibration element is positioned between the grip pipe and the drive motor. For fixation of the coil spring of the antivibration element it is provided that a first guide is monolithically formed on the grip pipe and a second guide is provided as a separate component. Providing the first guide therefore requires no additional components. Configuring the second guide as a separate component facilitates assembly.

Advantageously, the second guide is connected by a fastening section provided for its fixation on a rib of the drive motor. For compensation of tolerances, it is provided that the fastening section has at least one raised portion that, in the mounted state of the fastening section, projects into the area of the rib so that, upon mounting of the fastening section, the raised portion and/or the rib are plastically deformed. The plastic deformation of the raised portion and/or of the rib enables an excellent compensation of tolerances that are caused by the manufacture of the drive motor. In this way, no additional machining of the rib is required. The fastening section can be placed directly onto the rib that is produced advantageously by casting. The raised portions compensate an oversize or undersize of the rib; and, in this connection, particularly the raised portions are deformed. However, it can also be provided that the material of the raised portions is harder than the material of the ribs so that the rib is plastically deformed. Also, plastic deformation of the rib as well as of the raised portion can be advantageous. The plastic deformation causes the fastening section to be safely secured on the rib.

Advantageously, the fastening section has a support section on which on opposite sides positioning stays are provided wherein each positioning stay has at least one raised section and wherein the raised sections are arranged opposite one another. By arranging raised sections opposite one another, comparatively large tolerances can be compensated. In order to secure the position of the fastening section, it is provided that each positioning stay has at least two raised sections.

Advantageously, the grip pipe part is in the form of a grip housing that comprises a rear handle wherein the grip housing is connected by means of three antivibration elements to the drive motor in a functional (antivibration) connection. In order to provide excellent vibration damping, it is provided that the longitudinal center axis of the antivibration element is aligned approximately with the transverse direction of the motor chainsaw. Advantageously, all three antivibration elements have different damping actions in the different directions.

DESCRIPTION OF THE PREFERRED EMBODIMENTS

Figure 1:
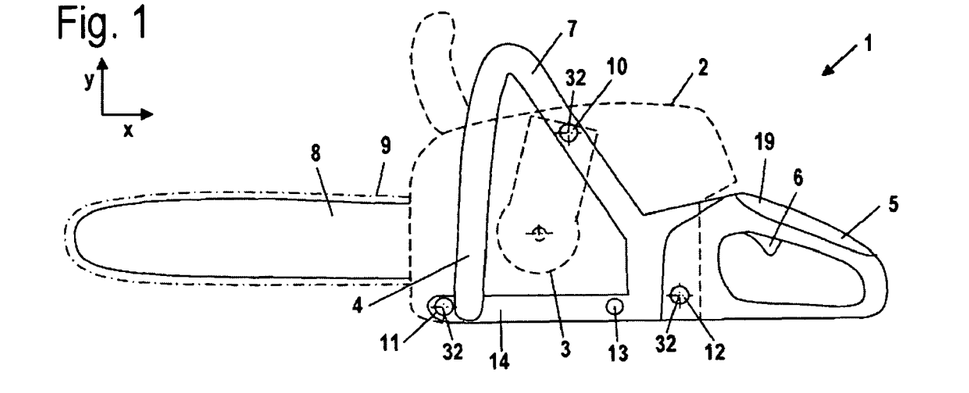
FIG. 1 is a schematic side view of a motor chainsaw.
Figure 2:
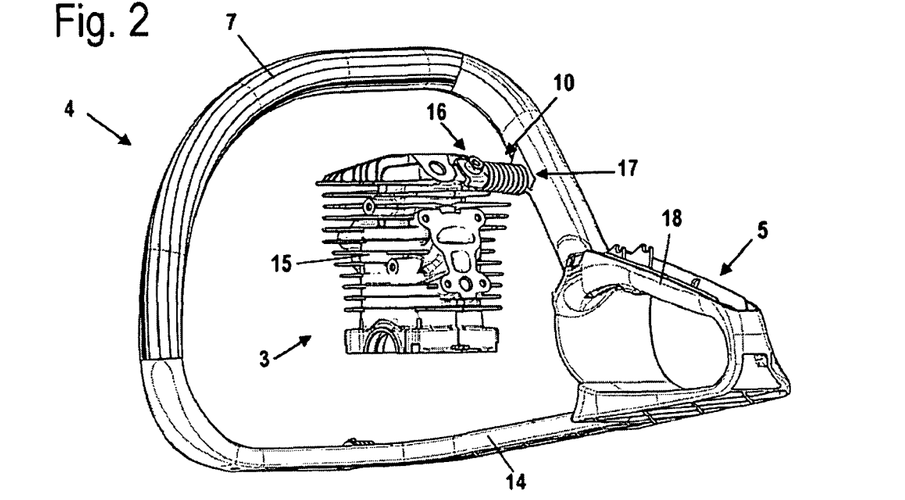
FIG. 2 is a perspective illustration of the grip housing of the motor chainsaw of FIG. 1 with a cylinder of the drive motor arranged therein.

FIG. 1 shows as one embodiment of a hand-guided power tool a motor chainsaw 1 in a schematic illustration. The hand-guided power tool can also be a cut-off machine, a trimmer or the like. The motor chainsaw 1 comprises a motor housing 2 in which a drive motor 3 is arranged. For clarity of illustration, the motor housing 2 and the drive motor 3 are illustrated in FIG. 1 in dashed lines. The motor chainsaw 1 has a grip housing 4 that comprises a rear handle 5 and grip pipe 7. In the area of the bottom side of the motor chainsaw 1 between the leading end of the grip pipe 7 and the rear handle 5 there is a stay 14 as also shown in FIG. 2. The rear handle 5 has a lower handle shell 18 (illustrated in FIG. 2) that is formed as a unitary part of the grip housing 4. In the lower handle shell 18 operating elements, for example, a throttle lever 6 as shown in FIG. 1, are arranged. The lower handle shell 18 is closed off by a separate upper handle shell 19 illustrated in FIG. 1.

The motor housing 2 is provided with a guide bar 8 projecting forwardly away from an end of the motor housing 2 remote from the rear handle 5. The motor housing 2 is spanned by the grip pipe 7 on the side facing the guide bar 8. On the guide bar 8 a saw chain 9 is arranged so as to be driven in circulation by drive motor 3.

In order to keep vibrations transmitted in operation of the motor chainsaw onto the housing 4 as minimal as possible, the grip housing 4 is connected to the motor housing 2 and thus the drive motor 3 by three antivibration elements 10, 11, 12 in a functional connection. A first antivibration element 10 is arranged between the grip pipe 7 and the drive motor 3. The antivibration elements 11 and 12 are arranged in the area of the bottom side of the motor housing 2 wherein a second antivibration element 11 is arranged on the side of the stay 14 that is facing the guide bar 8; a third antivibration element 12 is arranged neighboring the rear handle 5. Between the stay 14 and the motor housing 2 there is a stop 13 that limits the relative movement between motor housing 2 and grip housing 4 in transverse direction z that is perpendicular to the plane of the guide bar 8.

The motor chainsaw 1 has a longitudinal direction x extending in the length direction of the guide bar 8. A vertical direction y is positioned perpendicularly to the longitudinal direction x in the plane of the guide bar 8. Each antivibration element 10, 11, 12 has a longitudinal center axis 32 that is substantially oriented in the transverse direction z.

As shown in FIG. 2, the drive motor 3 is an internal combustion engine and comprises a cylinder 15. On the cylinder 15 a first end 16 of the first antivibration element 10 is secured. A second end 17 of the antivibration element 10 is arranged on the grip pipe 7. The antivibration element 10 is secured on the cylinder 15 at the level of the cylinder head.

Figure 3:
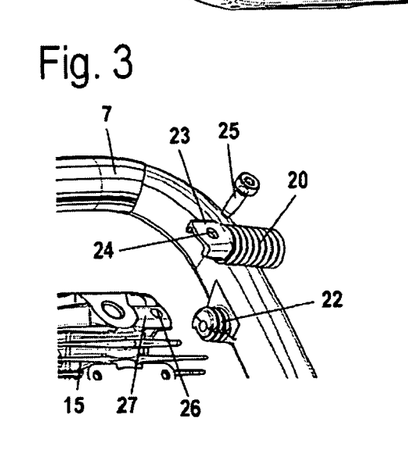
FIG. 3 shows the antivibration element of FIG. 2 in an exploded view.
Figure 4:
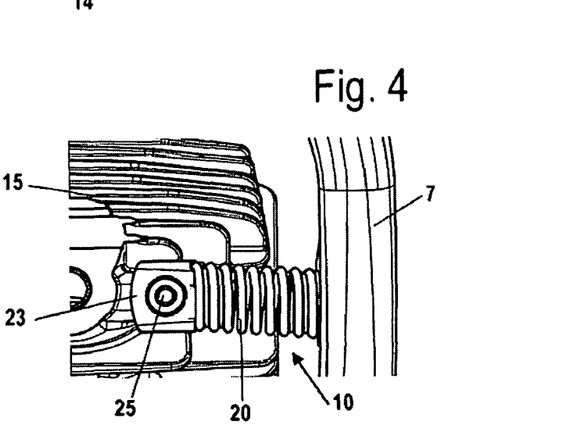
FIG. 4 shows the antivibration element of FIG. 3 in the mounted state in plan view.

As shown in FIG. 3, the antivibration element 10 comprises a coil spring 20. In the illustration of FIG. 3, a first plug is screwed into the coil spring 20 at the first end 16 (see FIG. 2) which plug is not illustrated in FIG. 3 and which is formed as a monolithic part of the fastening section 23. The fastening section 23 has an opening 24 for a fastening screw 25. The cylinder 15 has a rib 27 that has a bore 26 for the fastening screw 25. In this way, the first end 16 of the antivibration element 10 can be secured on the cylinder 15. For securing the second end 17, a second plug 22 is formed on the grip pipe 7 onto which the coil spring 20 can be screwed. In FIG. 4, the antivibration element 10 is shown in the assembled state.

Figure 5:
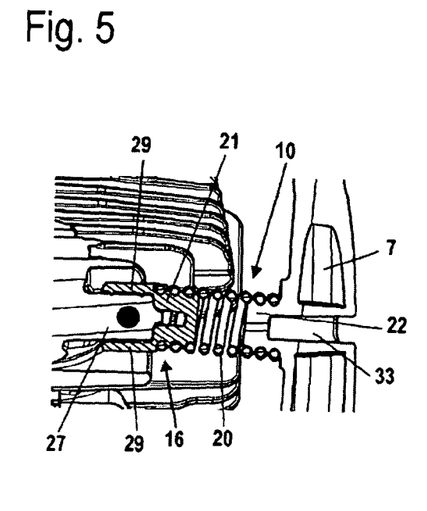
FIG. 5 is a section illustration of the antivibration element of FIG. 4.
Figure 6:
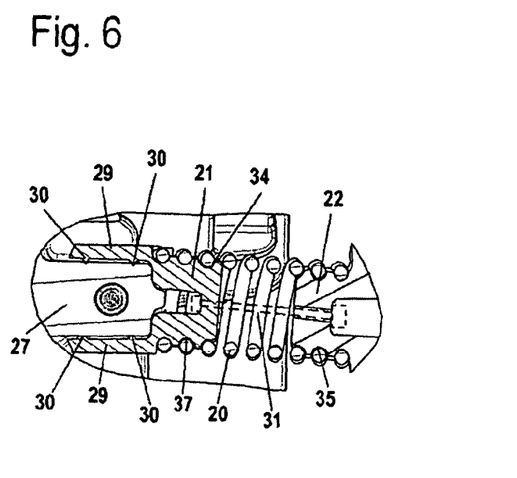
FIG. 6 is a detail illustration of a section view of FIG. 5.

FIGS. 5 and 6 show a section view of the antivibration element 10. At the first end 16 a first plug 21 is screwed into the coil spring 20. The first plug 21 is a monolithic part of the fastening section 23. The first plug 21 has a guide 34 that is embodied as a spiral groove and into which the coil spring 20 is screwed. On the second plug 22 a guide 35 is provided that is also embodied as a spiral-shaped groove. Between the two plugs 21 and 22, a securing device 31 (indicated in dashed lines in FIG. 6) can be arranged that prevents the parts from being torn apart.

Figure 7:
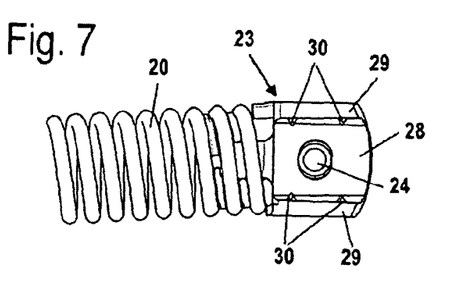
FIG. 7 is a bottom view of the antivibration element with fastening section arranged thereat.
Figure 8:
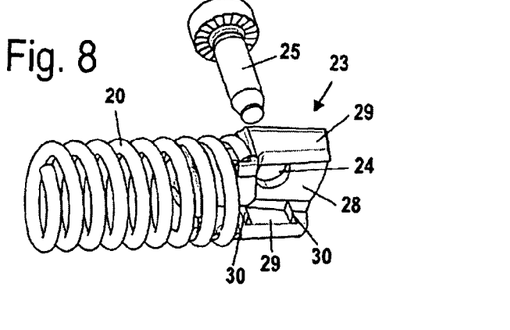
FIG. 8 is a perspective illustration of the antivibration element with fastening section arranged thereat.

As shown in FIG. 7 and FIG. 8, the fastening section 23 has a support section 28 with opening 24. On the support section 28 two positioning stays 29 are arranged that are positioned transversely to the support section 28 and define a U-shape together with the support section 28. On each positioning stay 29 there are two raised sections in the form of compensation ribs 30 that point toward one another. The compensation ribs 30 have a triangular cross-section with one corner of the triangle projecting in the direction of the oppositely arranged positioning stay 29.

As shown in FIGS. 5 and 6, the positioning stays 30 project into the area of the rib 27. When the fastening section 23 is placed onto the rib 27, the compensation ribs 30 and/or the rib 27 are plastically deformed. The pointed design of the compensation ribs 30 causes in particular deformation of the rib 27. In this way, it can be ensured that the fastening section 23 rests securely on the rib 27. Manufacturing tolerances of the cylinder 15 can be compensated with this arrangement.

Figure 9:
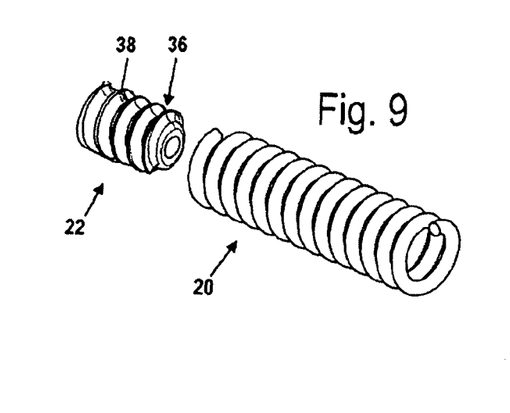
FIG. 9 is a perspective exploded view of the coil spring of the antivibration element of FIGS. 3 through 8 with the guide that is provided on the grip pipe.
Figure 10:
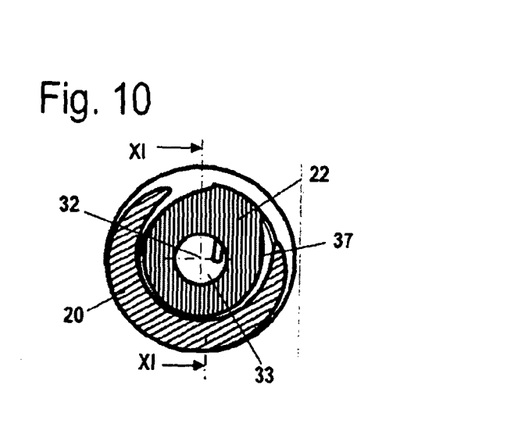
FIG. 10 is a section of the antivibration element of FIG. 9 with mounted guide in a view along the section line X-X of FIG. 11.

FIGS. 9 through 12 show in an exemplary fashion based on the second plug 22 the design of the guide 35. The guide 34 in the first plug 21 is advantageously of the same configuration. As shown in FIG. 9, the second plug 22 has a spirally shaped peripheral groove 36 that extends about the entire length of the second plug 22. The individual adjacently positioned turns of the groove 36 are separated from one another by a peripheral spiral stay 38. As shown in FIG. 9 and FIG. 10, the groove 36 in cross-section is of a non-circular shape; it is oval. As shown in FIG. 10, the spacing of the groove bottom 37 relative to the longitudinal center axis 32 of the coil spring 20, that corresponds to the longitudinal center axis of the antivibration element 10, changes thus during the course of a spiral turn.

Figure 11:
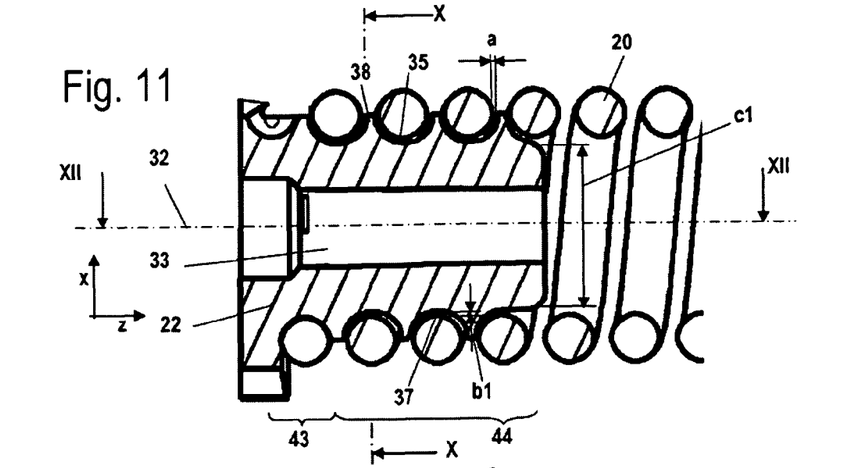
FIG. 11 is a section view along the line XI-XI of FIG. 10.

FIG. 11 shows a section view of the antivibration element in the transverse direction z and in the longitudinal direction x of the motor chainsaw 1 and perpendicularly to the vertical direction y. As shown in FIG. 11, the guide 35 has a securing section 43 and an adjoining guide section 44. The securing section 43 is arranged at the end of the coil spring 20 and the guide section 34 is arranged at the end of the securing section 43 that is facing the coil center. In the securing section 43 the coil spring 20 is tightly held on the guide 35. In this way, the coil spring 20 is fixedly secured within the securing section 43 on the plug 22.

In the guide section 44, the coil spring 20 has a spacing b1 relative to the groove bottom 37 in the section plane illustrated in FIG. 11. The spacing b1 is approximately constant in this section-plane across the entire length of the guide section 44. In the direction of the longitudinal center axis 32, the coil spring 20 has a spacing a relative to the stay 38 that delimits the groove 36 which spacing a is measured parallel to the longitudinal center axis 32 of the antivibration element 10. In this way, the coil spring 20 is movable relative to the longitudinal center axis 32 by a minimal amount in a direction parallel to as well as perpendicular to the longitudinal center axis 32. As soon as the coil spring 20 has overcome the spacing a, b1, the coil spring 20 contacts the guide 35. This causes the stiffness of the coil spring 20 to increase because only the turns of the coil spring 20 outside of the guide 35 can contribute to the spring action. At the groove bottom 37 the plug 22 has a diameter c1 shown in the section plane that is illustrated in FIG. 11. The plug 22 has a bore 33 that can serve, for example, for receiving the securing device 31 illustrated in FIG. 6.

Figure 12:
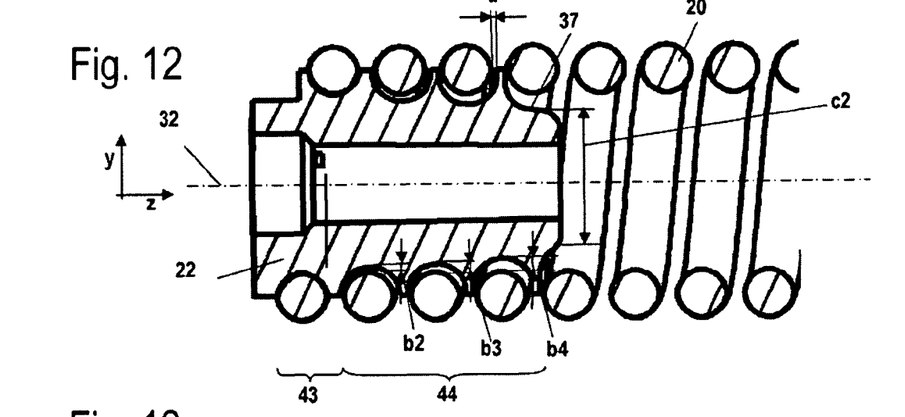
FIG. 12 shows a section view along the line XII-XII of FIG. 11.
Figure 13:
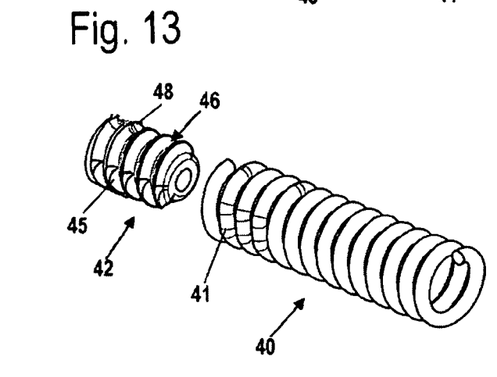
FIG. 13 is a perspective exploded illustration of another embodiment of a coil spring and guide.

FIG. 12 shows a section of the antivibration element 10 perpendicularly to the longitudinal direction x. As shown in FIG. 12, relative to the coil spring 20 the groove bottom 37 has a radial spacing b2 in the first turn of the guide section 44 adjacent to the securing section 43 which spacing b2 is measured radially relative to the longitudinal center axis 32. In the following turn the radial spacing has increased to a spacing b3; the next turn toward the coil center has a spacing b4. The spacing b between the groove bottom 37 and the coil spring 20 thus increases in the direction toward the center of the coil spring 20. All spacings b2, b3, b4 in this section plane are greater than the spacing b1 of the section plane illustrated in FIG. 11. In the axial direction there exits also the spacing a. As shown in FIG. 12, the plug 22 in the section plane shown in FIG. 12 has at its side facing the coil spring center a diameter c2 that is significantly smaller than the diameter c1. The diameter c2 can be, for example, approximately 60 percent to approximately 90 percent of the diameter c1.

As a result of the different spacings of the guide 35 relative to the coil spring 20 in the two section planes illustrated in FIGS. 11 and 12, the antivibration element 10 has a stiffness that is different in the vertical direction y than in the longitudinal direction x of the motor chainsaw 1. Because the spacing b1 is oriented in the longitudinal direction x and the spacings b2, b3, b4 are oriented in the vertical direction y, the stiffness of the antivibration element in the longitudinal direction x is greater than in the vertical direction y. Advantageously, the vibration elements 11 and 12 are also designed such that the stiffness of the vertical direction y is smaller than the stiffness in the longitudinal direction x. The diameter of the coil spring 20 is circular and constant.

Figure 14:
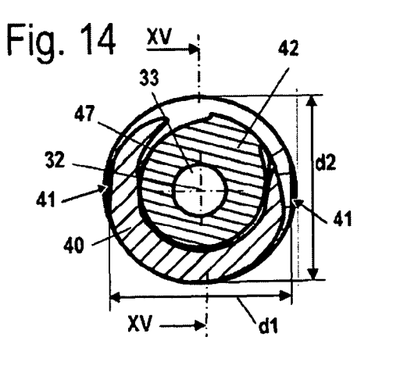
FIG. 14 is a section view of the antivibration element along the section line XIV-XIV in FIG. 15.

In the embodiment illustrated in FIGS. 13 to 16, a plug 42 is provided that has a coil spring 40 screwed in. The plug 42 has a guide 45 formed as a peripherally extending spiral-shaped groove 46. The groove 46 extends across the entire length of the plug 42. Neighboring groove sections of the groove 46 are separated from one another by a spiral-shaped peripherally extending stay 48. As shown in FIG. 14, the coil spring 40, about a section of its length, has a cross-section that deviates from a circular shape. The coil spring 40 is provided with flattened portions 41 on opposite longitudinal sides; the coil spring 40 has a diameter d1 in the area of these flattened portions. The diameter d1 is smaller than a diameter d2 that is measured perpendicularly thereto in the area without flattened portions. The groove 46 has a groove bottom 47 shown in FIG. 14 that extends at a constant radius spirally about the longitudinal center axis 32. The groove bottom 47 thus has in cross-section always the same spacing relative to the longitudinal center axis 32.

Figure 15:
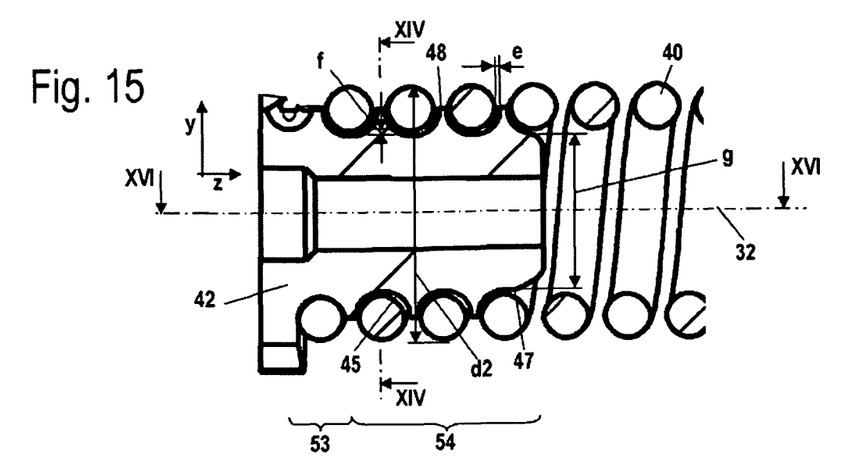
FIG. 15 is a section view along the section line XV-XV of FIG. 14.

As shown in the section view of FIG. 15, the coil spring 40 has a spacing f relative to the guide 45 in a plane perpendicular to the longitudinal direction x. The spacing f is provided in a guide section 54 adjoining a securing section 53. The coil spring 40 is secured on the guide 45 within the securing section 53. The guide 45 has a greater diameter in the area of the securing section 53 than in the guide section 54. In the guide section 54 the groove bottom 47 has a diameter g that is constant across the entire length of the guide section 54. In the axial direction the coil spring 40 has a spacing e relative to the stay 48. In the section plane illustrated in FIG. 15 the coil spring 40 is thus moveable minimally in the guide section 54 in the direction of the longitudinal center axis 32 as well as in a direction perpendicular thereto.

Figure 16:
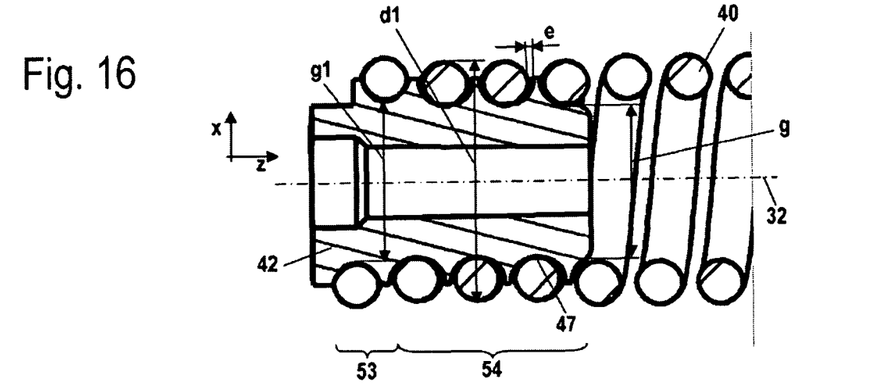
FIG. 16 is a section view along the section line XVI-XVI of FIG. 15.
Figure 17:
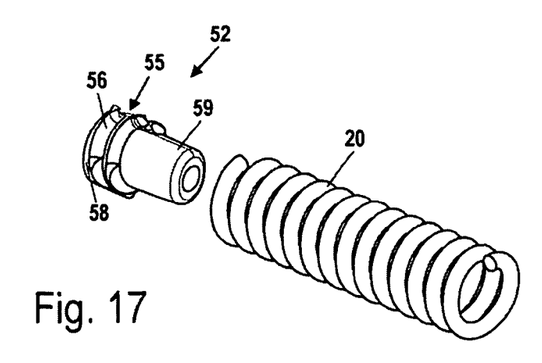
FIG. 17 is a perspective exploded view of another embodiment of the guide with coil spring.

In the section plane illustrated in FIG. 16 perpendicular to the vertical direction y the coil spring 40 is also resting at the groove bottom 47 within the guide section 54. As a result of the flattened portion 41, the coil spring 40 has in this area only a reduced diameter d1 that is selected such that a tight contact between the coil spring 40 and the groove bottom 47 exits. In the axial direction a minimal spacing e is provided. As a result of the contact of the coil spring 40 on the groove bottom 47, no movability in the longitudinal direction x of the motor chainsaw 1 is provided. In this direction, an antivibration element in an embodiment according to FIGS. 13 to 16 thus has increased stiffness.

FIGS. 17 to 20 show a further embodiment for configuring and guiding a coil spring of an antivibration element 10. The coil spring 20 shown in FIG. 17 has a constant circular cross-section. A plug 52 is provided that comprises a first guide 55 and a second guide 59. The first guide 55 is provided in the form of a groove 56 that is delimited by a peripherally extending spiral-shaped stay 58. In the area of the second guide 59 there is no peripheral stay or groove. In the longitudinal direction of the coil spring 20 the plug 52 is smooth in the area of the second guide 59.

Figure 18:
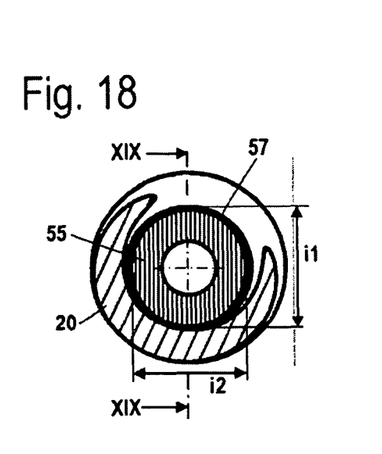
FIG. 18 is a section view of the antivibration element of FIG. 17 along the section line XVIII-XVIII of FIG. 19.
Figure 19:
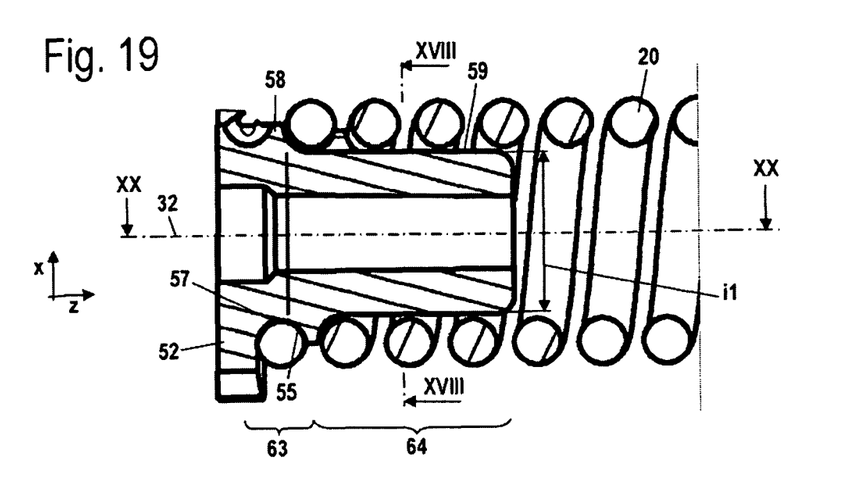
FIG. 19 is a section view along the section line XIX-XIX of FIG. 18.

As shown in FIG. 18, the plug 52 in the area of the second groove 59 has a first diameter i1 that is greater than a second perpendicularly measured diameter i2. As shown in FIG. 19 in the area of the first guide 55 a securing section 63 is formed in which the coil spring 20 is tightly secured in the guide 55. The second guide 59 forms a guide section 64. In the section perpendicular to the vertical direction y as illustrated in FIG. 19, the coil spring 20 rests against the second guide 59. The diameter i1 of the second guide 59 is constant in this section plane. In the securing section 63 the coil spring 20 rests against the groove bottom 57 and is held tightly in the guide 55.

Figure 20:
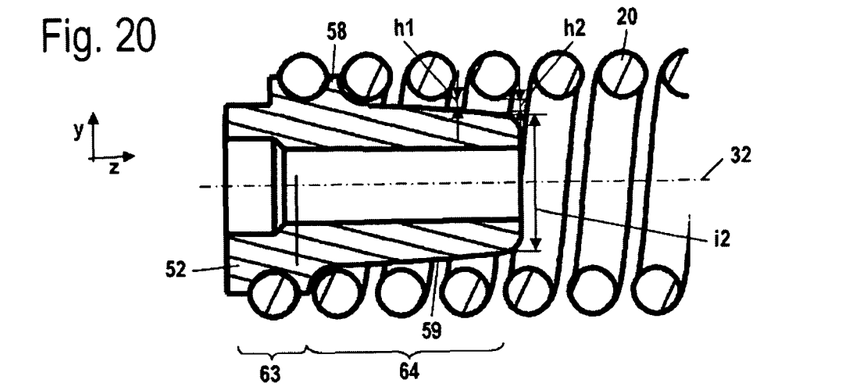
FIG. 20 is a section view along the section line XX-XX of FIG. 19.
Figure 21:
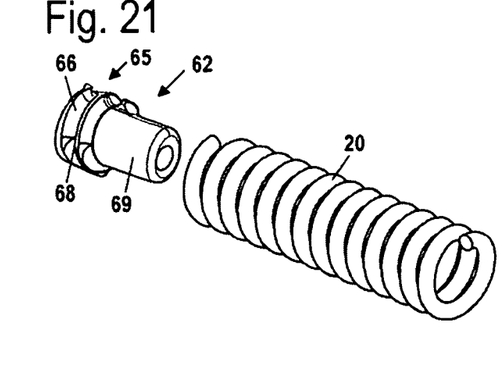
FIG. 21 is a perspective exploded view of another embodiment of a guide with coil spring.
Figure 22:
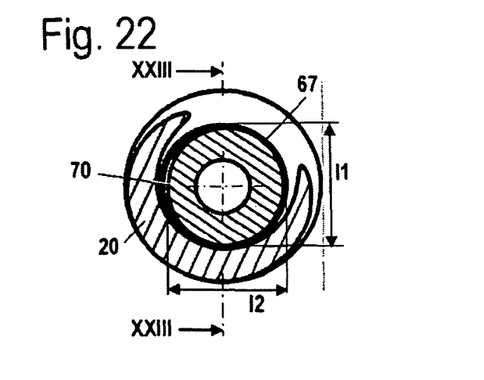
FIG. 22 is a section view of the antivibration element of FIG. 21 along the section line XXII-XXII of FIG. 23.

As shown in FIG. 20, the second guide 59 tapers conically in the direction perpendicularly to the longitudinal direction x. At the end that is facing the center of the coil spring 20, the guide 59 has a diameter i2 of, for example, approximately 64 percent to approximately 90 percent of the diameter i1. The cross-section of the guide 59 is of an oval shape. As shown in FIG. 20, the coil spring 20 relative to the guide 59 has a radial spacing h1 that, over the course of a turn, increases to a spacing h2. As a result of the increase of the spacing h a progressive characteristic line of the antivibration element can be achieved for a load acting in the vertical direction y. In the longitudinal direction x the characteristic line is linear as a result of the contact of the coil spring 20 on the guide 59.

In the embodiment illustrated in FIGS. 21 to 24, a plug 62 is provided that has a first guide 65 and a second guide 69. The second guide 69 is a groove 66 that is delimited by a peripherally extending spiral-shaped stay 68. In the area of the second guide 69 there is no stay so that the coil spring 20 in this area is not subjected to a guiding action in the direction of the longitudinal center axis 32.

As shown in the Figures, the plug 62 in the area of the second guide 69 has a first diameter l1 and a diameter l2 measured perpendicularly thereto that is smaller than the diameter l1. The cross-section of the plug 62 is asymmetric. The plug 62 has at one side a flattened portion 70 that is the reason for the reduced diameter l2. The opposite side of the plug 62 is of circular shape.

Figure 23:
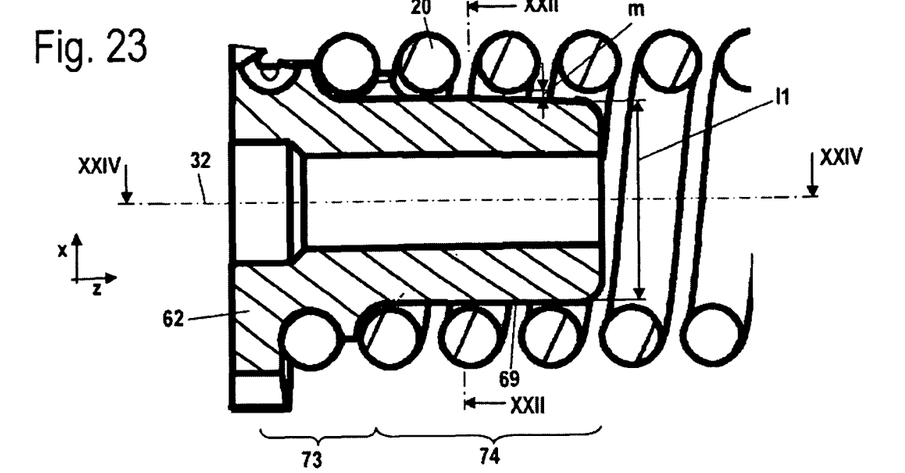
FIG. 23 is a section view along the section line XXIII-XXIII of FIG. 22.

FIG. 23 shows a section of the antivibration element in a direction perpendicular to the vertical direction y. The coil spring 20 is guided in a securing section 73 in groove 66 and is fixedly held therein. In adjoining guide section 74, the coil spring 2 has relative to the guide 69 a minimal radial spacing m. In the securing section 73 the coil spring 20 rests against the groove bottom 67 of the groove 66.

Figure 24:
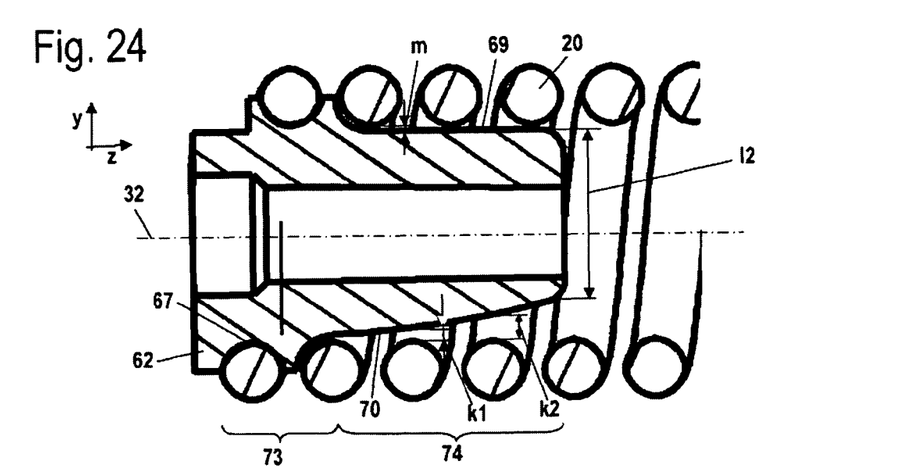
FIG. 24 is a section view along the section line XXIV-XXIV of FIG. 23.

As shown in FIG. 24, in a section direction perpendicular to the longitudinal direction x, the coil spring 20 has on one side a reduced spacing m relative to the guide 69. On the opposite side, the plug 62 has a flattened portion 70. Accordingly, on this side an increased radial spacing k1 results that increases in the direction of the central coil spring 20 to a spacing k2. In this way, the coil spring 20 can carry out a movement in the upward direction relative to the plug 62 in the illustration of FIG. 24 until the spacings k1 and k2 are overcome. Therefore, in this direction a progressive characteristic line results. In the opposite direction, i.e., for a movement of the coil spring 20 in FIG. 24 in the downward direction, only a very minimal relative movement is possible until the coil spring 20 after overcoming the spacing m contacts the guide 69. In this way, different spring stiffness is obtained in different directions.

Figure 25:
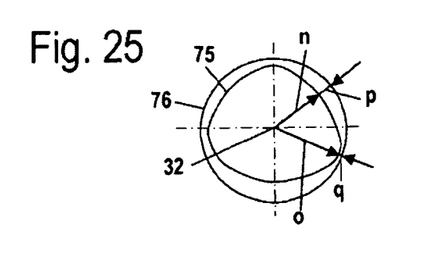
FIG. 25 is a schematic section illustration of another embodiment of the antivibration element.

FIG. 25 shows schematically an embodiment of a guide 75 that rests on the inner circumference 76 of a coil spring (not illustrated in detail). The guide 75 has a cross-section deviating from a circular shape while the inner circumference 76 of the spring is circular. The cross-section of the guide 75 is similar to a triangle with rounded corners. In three areas that are spaced by approximately 120 degrees relative to one another, the guide 75 has a radius n. In this area, the spring has a spacing p relative to the guide 75. In the intermediate areas, the guide 75 has a greater second radius o. In the area of the second radius o, the guide 75 has relative to the inner circumference 76 of the spring only a very minimal radial spacing q. In this way, the coil spring 76 can travel a relatively large distance in the directions of the spacing p so that a minimal stiffness results. In the directions where the spacing o exists, only minimal relative movement is possible so that a greater stiffness results.

Figure 26:
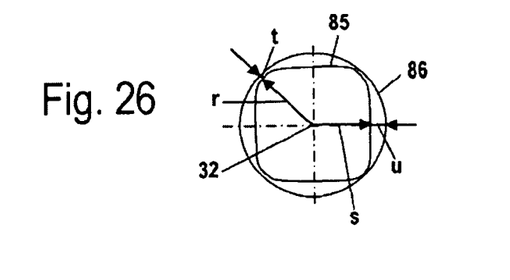
FIG. 26 is a schematic section illustration of yet another embodiment of the antivibration element.

In the embodiment illustrated in FIG. 26 a guide 85 is provided that corresponds to a square with rounded corners and is arranged inside a coil spring (not illustrated in detail) that has an inner circular circumference 86. In the area of the rounded corners, the guide 85 has a radius r that is somewhat smaller than the inner radius 86 of the spring. Between the guide 85 and the inner circumference 86 of the spring, a very minimal first spacing t is provided. In the areas that are located between the rounded corners, the guide 85 has a radius s that is smaller than the radius r. In these areas, there is a second spacing u between the guide 85 and the inner circumference 86 of the spring which spacing u is significantly greater than the first spacing t. In this way, in these directions a greater relative movement of the coil spring relative to the guide 85 can be performed. This configuration also enables the generation of different stiffness in different directions.

It can also be provided that the coil spring as well as the guide have a cross-section that deviates from a circular shape. Also, other or asymmetric cross-sections can be advantageous. Advantageously, all three antivibration elements 10, 11, 12 are provided with different stiffness in different directions and oriented in such a way that a great stiffness is provided in the longitudinal direction x and a minimal stiffness is provided-in the vertical direction y.

The specification incorporates by reference the entire disclosure of German priority document 10 2007 048 887.6 having a filing date of Oct. 11, 2007.

While specific embodiments of the invention have been shown and described in detail to illustrate the inventive principles, it will be understood that the invention may be embodied otherwise without departing from such principles.

What is claimed is:

1. A hand-guided power tool comprising:
   a drive motor;
   a tool in driving connection with the drive motor;
   at least one handle for guiding the power tool in operation;
   at least one antivibration element functionally connecting the at least one handle and the drive motor;
   wherein the at least one antivibration element comprises a coil spring and a guide, wherein the coil spring has an end connected to the guide;
   wherein the coil spring has a first radial spacing relative to the guide in a first radial direction and has a second radial spacing relative to the guide in a second radial direction, wherein the second spacing is smaller than the first spacing or is zero, so that a damping effect in the first radial direction differs from a damping effect in the second radial direction;
   wherein the first radial direction intercepts perpendicularly the second radial direction;
   wherein the guide has a cross-section that deviates from a circular shape.

2. The power tool according to claim 1, wherein the guide has a securing section and a guide section, wherein the guide section is closer to a center of the coil spring than the securing section, wherein the coil spring is secured on the securing section and wherein the first spacing of the coil spring is provided relative to the guide section.

3. The power tool according to claim 1, wherein the cross-section of the guide is oval or the cross-section of the guide is of a basic circular shape with at least one flattened portion.

4. The power tool according to claim 1, comprising a plug projecting into an interior of the coil spring wherein the guide is provided on the plug.

5. The power tool according to claim 1, wherein the guide comprises a spiral-shaped groove extending at least across a section of the guide.

6. The power tool according to claim 5, wherein the groove extends across an entire length of the guide.

7. The power tool according to claim 5, wherein the guide has a securing section and a guide section, wherein the coil spring has a third spacing relative to the groove within the guide section, the third spacing being measured in a direction of a longitudinal center axis of the at least one antivibration element.

8. The power tool according to claim 5, wherein the guide has a securing section and a guide section, wherein the coil spring is not guided within the guide section in a direction of a longitudinal center axis of the at least one antivibration element.

9. The power tool according to claim 1, wherein the power tool is a motor chainsaw and wherein the tool is comprised of a saw chain driven in circulation about a guide bar, wherein a first one of the at least one antivibration element is oriented transversely to a plane of the guide bar.

10. The power tool according to claim 9, wherein the motor chainsaw has a longitudinal direction oriented in a length direction of the guide bar; a vertical direction that is perpendicular to the longitudinal direction and positioned within a plane of the guide bar; and a transverse direction that is transverse to the plane of the guide bar, wherein the first spacing is aligned in the vertical direction.

11. The power tool according to claim 10, wherein the second spacing is aligned with the longitudinal direction of the motor chainsaw.

12. The power tool according to claim 11, wherein the coil spring has no spacing relative the guide in the longitudinal direction of the motor chainsaw.

13. The power tool according to claim 1, comprising a motor housing, wherein the at least one handle is a grip pipe spanning the motor housing, wherein a first one of the at least one antivibration element is arranged between the grip pipe and the drive motor.

14. The power tool according to claim 13, wherein the antivibration element comprises an additional guide, wherein the guide is formed on the grip pipe and wherein the additional guide is provided on a separate component.

15. The power tool according to claim 1,
   wherein the guide has a fastening section and the guide is fastened with the fastening section on a rib of the drive motor, wherein the fastening section has at least one raised portion and the raised portion, in a mounted state of the guide, projects into the area of the rib, wherein, upon mounting of the guide on the rib, at least one of the raised portion and the rib is plastically deformed.

16. The power tool according to claim 15, wherein the fastening section has a support section provided on opposite sides with positioning stays, wherein the positioning stays each have at least one raised section, wherein the raised sections are positioned opposite one another and face one another.

17. The power tool according to claim 16, wherein the positioning stays each have at least two of said raised sections.

18. The power tool according to claim 1, comprising a motor housing, wherein the at least one handle is part of a grip housing that comprises a rear handle and a grip pipe spanning the motor housing, wherein the grip housing and the drive motor are functionally connected to one another by at least three of said at least one antivibration element that each have a longitudinal center axis extending approximately in a transverse direction of the power tool.

19. A hand-guided power tool comprising:
   a drive motor;
   a tool in driving connection with the drive motor;
   at least one handle for guiding the power tool in operation;
   at least one antivibration element functionally connecting the at least one handle and the drive motor;
   wherein the at least one antivibration element comprises a coil spring and a guide, wherein the coil spring has an end connected to the guide;
   wherein the coil spring has a first radial spacing relative to the guide in a first radial direction and has a second radial spacing relative to the guide in a second radial direction, wherein the second spacing is smaller than the first spacing or is zero;
   wherein the coil spring has a cross-section that deviates from a circular shape;
   wherein the coil spring in the first radial direction has a first diameter and in the second radial direction has a second diameter, wherein the first radial direction intercepts perpendicularly the second radial direction;
   wherein the second diameter is smaller than the first diameter.

20. The power tool according to claim 19, wherein the guide has a securing section and a guide section, wherein the coil spring has at least one flattened portion on a longitudinal side extending parallel to a longitudinal centeraxis of the coil spring, wherein the flattened portion is located within the guide section.

* * * * *